United States Patent [19]
Webber et al.

[11] Patent Number: 6,009,413
[45] Date of Patent: Dec. 28, 1999

[54] SYSTEM FOR REAL TIME SHOPPING

[75] Inventors: John C. Webber, Dublin; Gregory S. Gerard, Columbus, both of Ohio

[73] Assignee: America Online, Inc., Dulles, Va.

[21] Appl. No.: 08/971,764

[22] Filed: Nov. 17, 1997

Related U.S. Application Data

[63] Continuation of application No. 08/337,097, Nov. 10, 1994, abandoned.

[51] Int. Cl.$^6$ ........................................................ G06F 15/00
[52] U.S. Cl. ................................. 705/26; 705/27; 705/20
[58] Field of Search ....................... 340/825.28; 235/380; 705/10, 26, 27, 20; 364/918.5; 395/712

[56]  References Cited

U.S. PATENT DOCUMENTS

| | | | |
|---|---|---|---|
| 4,972,504 | 11/1990 | Daniel | 364/403 |
| 5,053,956 | 10/1991 | Donald | 364/403 |
| 5,088,586 | 2/1992 | Isobe | 364/403 |
| 5,451,998 | 9/1995 | Hamrick | 364/403 |
| 5,475,585 | 12/1995 | Bush | 364/403 |
| 5,528,490 | 6/1996 | Hill | 364/403 |

OTHER PUBLICATIONS

Richard Tompkins, The Financial Times (London) Jun. 9, 1994, at 20.
Brenda Lloyd, *Sabre Offers EDI Expertise,* Apparel Industry Magazine, (vol. 54, No. 10), at 47.
*The Online Economy,* Information Week, Jul. 4, 1994.
Max Hopper, *AMR Information Services,* Harvard Business Review, May/Jun. 1990, at 118.
Hopper, Max D. AMR Information Services, Harvard Business Review, May/Jun. 1990 p. 118.
Tompkins, Richard, The Financial Times (London) p. 20 Jun. 9, 1994.
Lloyd, Brenda Sabre Offers EDI Expertise Apparel Industry Magazine, v 54, N 10, p. 47 Information Week, The Online Economy Jul. 9, 1994.

*Primary Examiner*—Michael Horabik
*Assistant Examiner*—Albert K. Wong
*Attorney, Agent, or Firm*—Standley & Gilcrest LLP

[57]   ABSTRACT

A system is disclosed in which a user's personal computer may access a variety of information regarding products and services, through a computer network, in real time. The computer network collects product/service information from various sources, such as gift stores, clothiers, computer dealers, etc. and formats the information in a recognizable manner to enable the information to be viewed by a user at the user's personal computer. The network performs a single search from a single search command from the user.

3 Claims, 4 Drawing Sheets

SYSTEM FOR REAL TIME SHOPPING

This application is a file wrapper continuation of application Ser. No. 08/337,097 filed Nov. 10, 1994 now abandoned.

BACKGROUND AND SUMMARY OF THE INVENTION

The present invention relates generally to a system for use in on-line shopping, and more particularly, to a computer system that enables a user to have real time access to product/service information and direct product/service ordering from multiple merchants.

On-line shopping is typically conducted through a network host that maintains product/service information from a variety of merchants, takes orders from the network host's customers and forwards the orders to the respective merchant. However, this is merely one step in a multiple step process. Before this transaction may take place, several preliminary steps must be accomplished. First, each participating merchant forwards product information and pricing to the network host for posting to the network to solicit purchasers. This product information and pricing is usually transferred to the network host through conventional mail, telephone service or by sending such information to the appropriate on-line address at the network host. The network host then compiles, classifies, sorts, stores and displays the product information on-line to network host customers that request such information.

For several reasons, the product information may vary from day-to-day. The above described process may involve a significant time lag between the time that the merchant sends the product information to the network host and the time the potential consumer receives the product information. Therefore, merchants must account for such a time lag and must provide conservative estimates on the product information. Merchants must anticipate market fluctuations in pricing and availability and must hedge against such market changes. For example, a merchant may send product information to the network host regarding a specific product. Customer demand for such a product may dramatically increase and more orders for the product may be placed with the merchant through the network host than was anticipated by the merchant. The merchant may then receive more orders for the product than the merchant can readily provide. Product orders must then be placed on back-order or remain unfilled indefinitely. The merchant is unhappy at his inability to fill the orders and receive the profits based on the orders received but unfilled. Customers are unhappy at not receiving their merchandise on a timely basis and may be forced to acquire such products elsewhere at a higher cost or they may forgo the purchase altogether.

Additional problems exist for the customer who wants to purchase a given product or service. Previously, such customers were required to "shop" one merchant at a time. A customer had to access the database of one merchant, collect information regarding the desired product or service, store the information, access another merchant's database and again collect information regarding the desired product or service. This process had to be repeated for each merchant. Thus, the process required the customer to "shop" all available merchants before deciding the merchant from whom the customer was going to purchase. This process is complicated by the fact that many customers may have vague or indefinite parameters defining the selection criteria and parameters. For instance, a customer may know that pants are required but may not be able to sufficiently narrow the criteria into styles of pants or name brands. Here, the customer would need to browse each individual merchant's wares and by that scan many undesirable pants. Additionally, as the customer successively "shops" individual merchants, the customer may learn to narrow or change the parameters for the search. The customer may then want to repeat the shopping already accomplished. The above described process is time consuming. Such time consumption can be especially important when accessing an on-line service that charges the user based on on-line time.

There is a need to provide product/service information for multiple merchants in real time to a potential customer that would otherwise not be available for weeks or months. In this age of daily market fluctuations, it is advantageous to a potential customer to be able to have accurate, real time information concerning product availability and pricing for multiple merchants. As product pricing and availability fluctuate and differ between merchants, the importance to the customer of being able to respond to those fluctuations and differences on a timely basis increases. A customer can decide in real time whether to purchase one product over another product or whether to purchase a product from one merchant over another merchant.

The present invention is designed to provide a user with real time product/service information, from a variety of merchants, in a format that is understandable and informative. The present invention is unique in that never before has there been a network system that conducts a search of multiple sources of shopping information, in substantially real time, and presents the results to the user in one organized presentation.

The present invention is a sophisticated computerized system by which various merchants may be electronically connected to a computer network such as the CompuServe® network. Value added software is provided at the network to assimilate the data collected from various and multiple merchants in real time, to place the data in an understandable format for preferably a single presentation to the user. The user receives the assimilated data from the various and multiple merchants through an electronic connection (via modems) between the user's computer and the network. A program on the user's computer can capture the formatted data supplied by the network and prepare it for display or analysis. In an alternate configuration the merchant is electronically connected to a regional host. The regional host is equipped to receive product/service information from the merchant. The regional host is then electronically connected to the computer network.

The system of the present invention has many advantages over known product/service information management methods. First, the present invention offers a "real time" picture of available products and/or services from multiple and varied merchants. Second, the present invention allows a merchant the ability to react in "real time" to the demand. Third, the present invention offers the capability to a user of acquiring various merchants' product/service information in one understandable format that is currently not available by other methods.

These and other advantages will be apparent from the following detailed description of the invention, drawings, and claims.

DETAILED DESCRIPTION OF PREFERRED EMBODIMENT(S)

Figure 1:
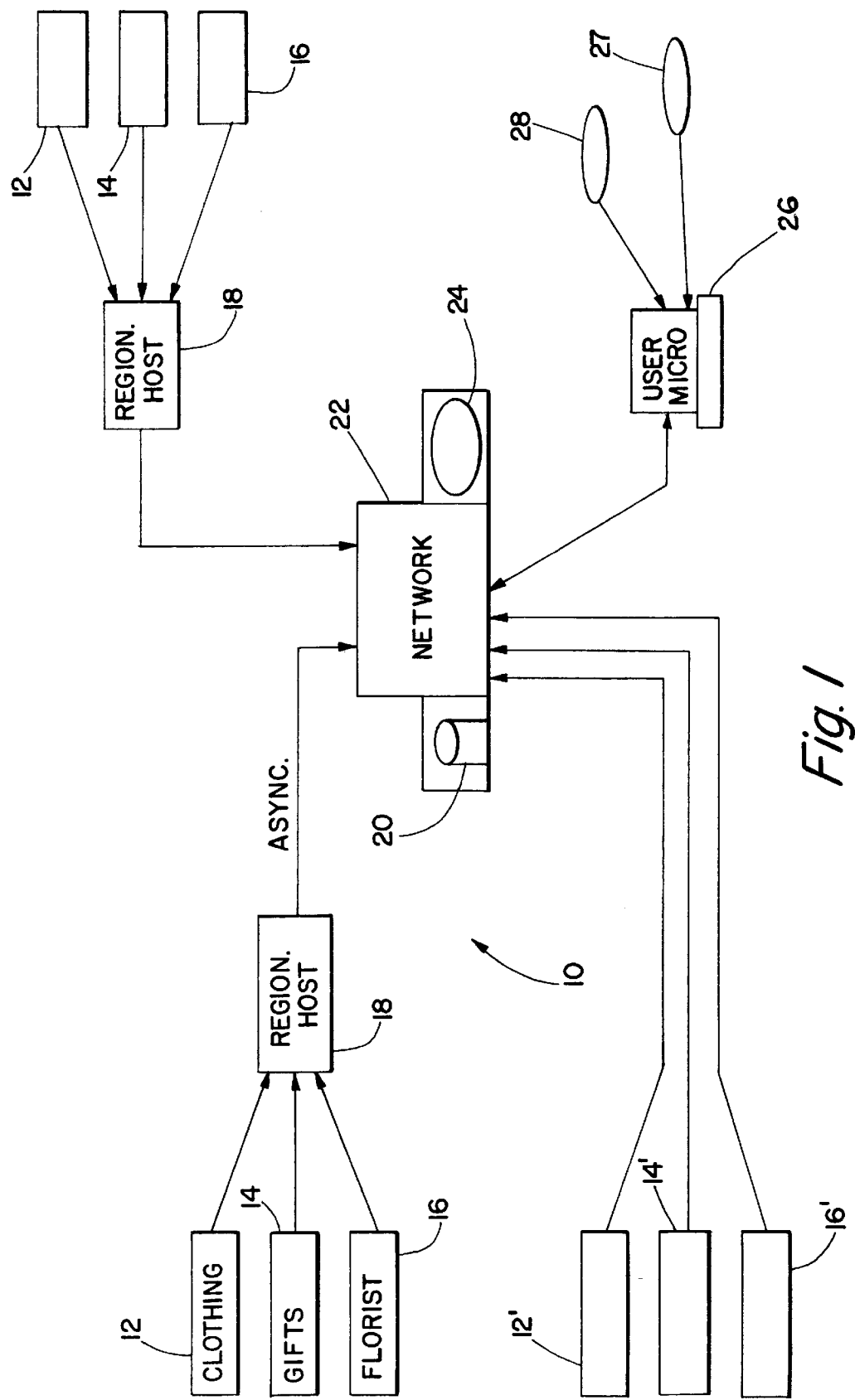
FIG. 1 is a diagrammatic view of one embodiment of the present invention.

Referring now to FIG. 1, there is shown a preferred embodiment of the system 10 of the present invention. Contributing merchants 12, 14, 16 (such as clothiers, gift shops, florists, etc.) are shown connected to a regional host computer 18. A preferred alternative is for the merchants 12', 14', 16' to connect directly to a computer network 22. Each merchant downloads data to the computer network or regional host at least once each business day and more frequently as desired by the organizations and users of the present invention. Each merchant provides detailed, current information regarding products and/or services offered by the merchant. The ability of the present invention to receive data from multiple merchants and multiple regional hosts is also exemplified in FIG. 1. Network 22 may be connected to any number of merchants 12', 14', 16' and regional hosts 18.

If a merchant is connected to a regional host, the regional host must send the information obtained from the various merchants to a computer network 22. Preferably, the merchants are connected directly to the computer network 22 that may then store the received data on the computer network database 20. The network 22 assimilates the various data into an understandable format that is preferably organized in such a way to enable the user to quickly find the needed information. The network computers are preferably equipped with a software program 24 designed to receive the data collected from the various merchants, put it in a usable protocol and organize it for each user so that all of the product/service information requested by a user is contained in one on-screen presentation. The software of the present invention can quickly generate a new product/service presentation as the data changes from the merchants in real time. The software also preferably accomplishes various mathematical and accounting functions to offer the user the capability of not only gathering real time product/service information from various sources but combining and computing that information so that additional information is provided, such as may prove valuable when comparison shopping.

Once the software at the network has organized and presented the data in an understandable format, the data is ready to be electronically transferred to the user's computer 26. The user may access the network via a modem on the user's computer and a modem at the network. Optionally, the user may be provided an information management interface 27 to simplify communication between the user's computer and the network. Security codes that would be assigned to each user would enable the network to identify a user before providing product/service information to the user's computer. For security reasons, the system is preferably arranged so that the user can receive information (at the user's request) but is equipped so that the user cannot alter the information by accessing merchant records. Additionally, the system is preferably equipped with the capability of enabling the user to manipulate the data at the user's computer so that it can be presented in several formats and to allow calculations to be performed with the data. The user's computer may use several known software packages 28 to assist in use and preparation of the data.

To access the product/service information the user logs on to his or her computer and connects with the network via a modem at the user's computer and a modem at the network. The user then makes a request for product/service information currently residing at the network database. This request is preferably accomplished by the user subscribing to the network's access service and using the information management interface 27. Such access services typically provide each user with the needed communication protocols and access steps to be taken to connect with the network host computer(s). The network database(s) receives updated information regularly from the various merchants in an automatic down loading that may occur in batch mode one or more times each day. Preferably, the network database(s) receives updated information in real time from the various merchants as the information is updated. Optionally, a regional host may receive such updated information and be required to send that information to the network database.

Figure 2:
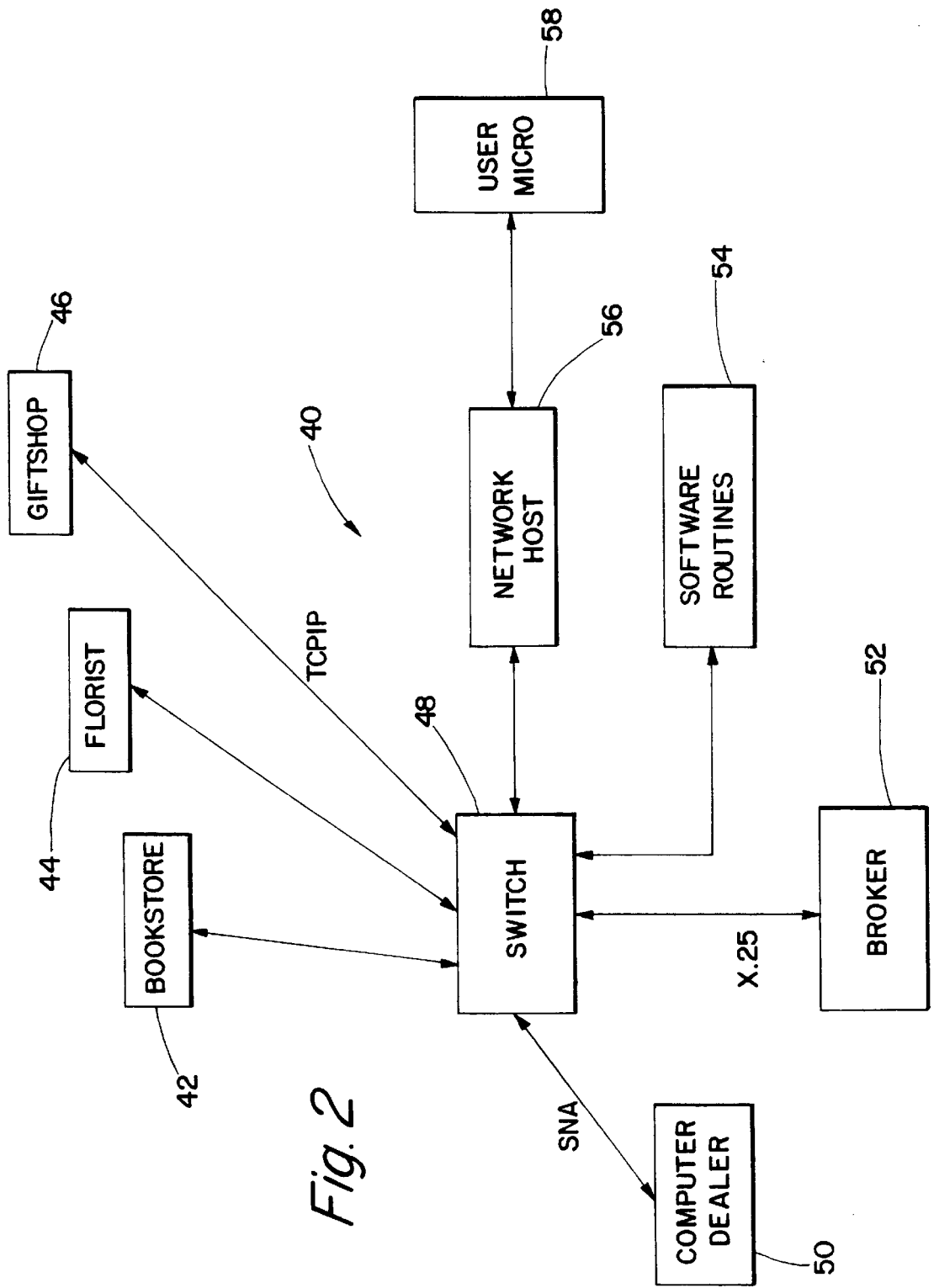
FIG. 2 is a diagrammatic view of a second embodiment of the system of the present invention.

Referring now to FIG. 2, a second embodiment of the present invention is shown. In this embodiment, the versatility of the present invention is exemplified by the ability of the invention to receive data from a variety of sources in a variety of connectivities. In the complete system 40, a bookstore 42, a florist 44 and a gift shop 46, may each have a two-way communication path with a central switch 48. These two-way communication paths may be based on TCP/IP transport connectivity. A computer dealer 50 may have a two-way communication path established with the switch 48 using an SNA connectity. A broker 52 may have a two-way communication path with switch 48 over an X.25 connectivity.

Commercially available software routines 54 may be accessed by the switch 48 for use in assimilating and presenting the product/service information obtained from all sources. The switch 48 may act as the terminal through which the data is transferred to the network host 56. The connection between the network host and the switch 48 may also be an X.25 connectivity. Data may be transferred from all of the merchants to the main switch 48 by Ethernet, a packet switch network, modem, or otherwise. Optic transmission lines or regular phone lines may be used as the physical means by which the data transfer occurs. A user's computer 58 accesses the host 56, typically by dialing a phone number for the host accomplished by the modem at the user's computer.

Figure 3:
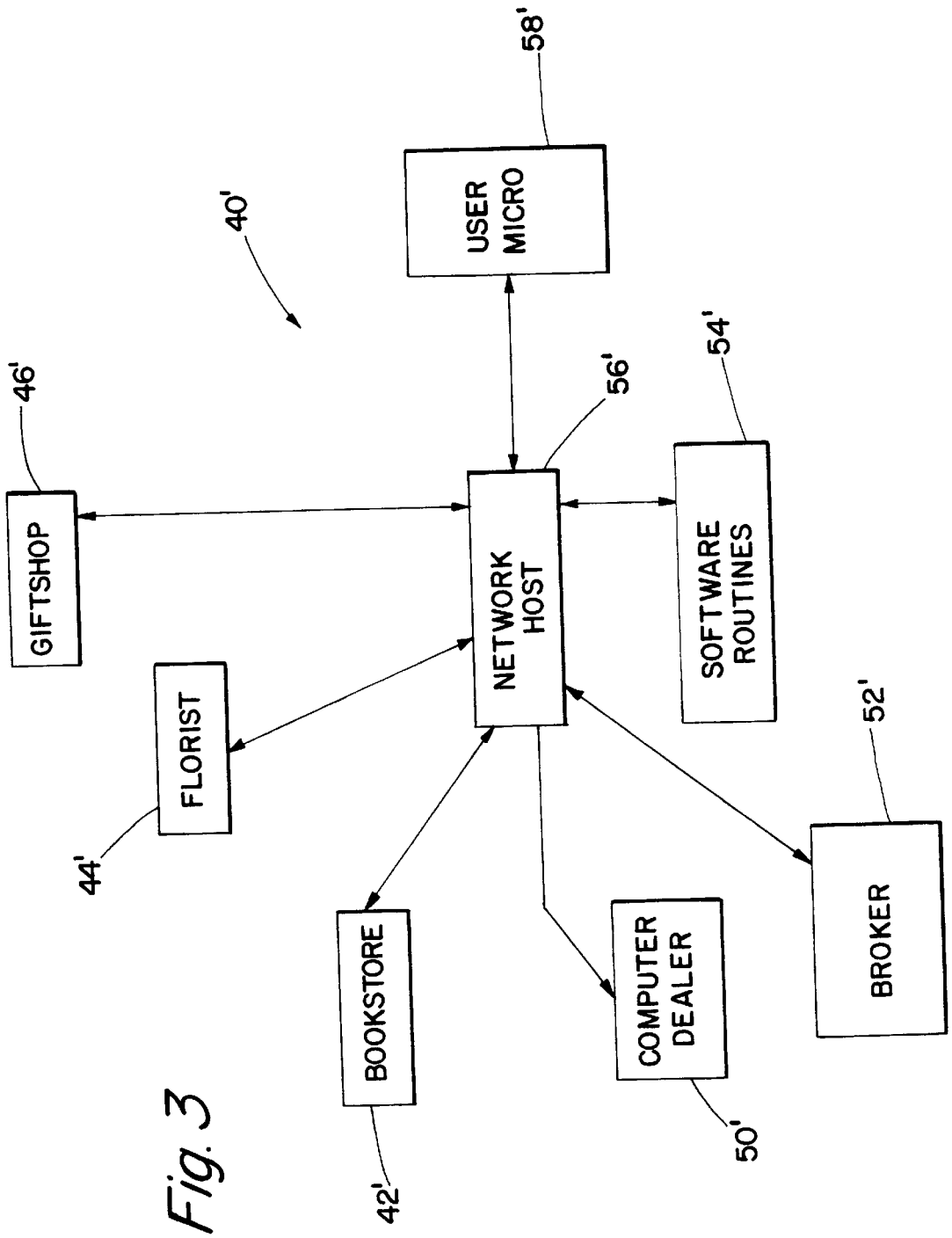
FIG. 3 is a diagrammatic view of a third embodiment of the system of the present invention.

Referring to FIG. 3, a preferred third embodiment of the present invention is shown. In this embodiment, the ability of the network host 56' to directly receive data from a variety of sources in a variety of connectivities is shown. Numerical designators correspond to those of FIG. 2 but are designated here through primes. In this embodiment, the use of a central switch, as in FIG. 2, is rendered unnecessary by the network host 56'. The bookstore 42', the florist 44' and the gift shop 46', may each have a two-way communication path directly to the network host 56'. Again, these two-way communication paths may be based on TCP/IP transport connectivity. A computer dealer 50' may have a two-way communication path established with the network host 56', with an SNA connectivity. A broker 52' may have a two-way communication path with network host 56' over an X.25 connectivity. In this embodiment, the software routine 54' for use in assimilating and presenting the product/service information obtained by all sources is accessed by the network host 56'. Again, data may be transferred using any of the media described above or by other suitable methods.

Referring to both FIGS. 2 and 3, operation of the system with the network host 56 (56') may be understood. Software available at the host 56 enables the user to obtain all merchant product/service information that is currently available and to be able to understand it in a recognizable fashion. Raw data coming from various merchants is not advantageous to a user unless the data is presented in a recognizable and understandable format. The present invention accomplishes this objective by resident software at the host 56, which assimilates all of the data collected from the various merchants, and makes the data available to a user, on the user's computer screen, in an easy to read format. For example, a user shopping for a book may see on the user's computer screen a display showing the current product/service information on books from multiple merchants. Taken further, resident software at the network host 56 may perform other calculations designed to tailor presentation of the data for comparison shopping of books between merchants.

Figure 4:
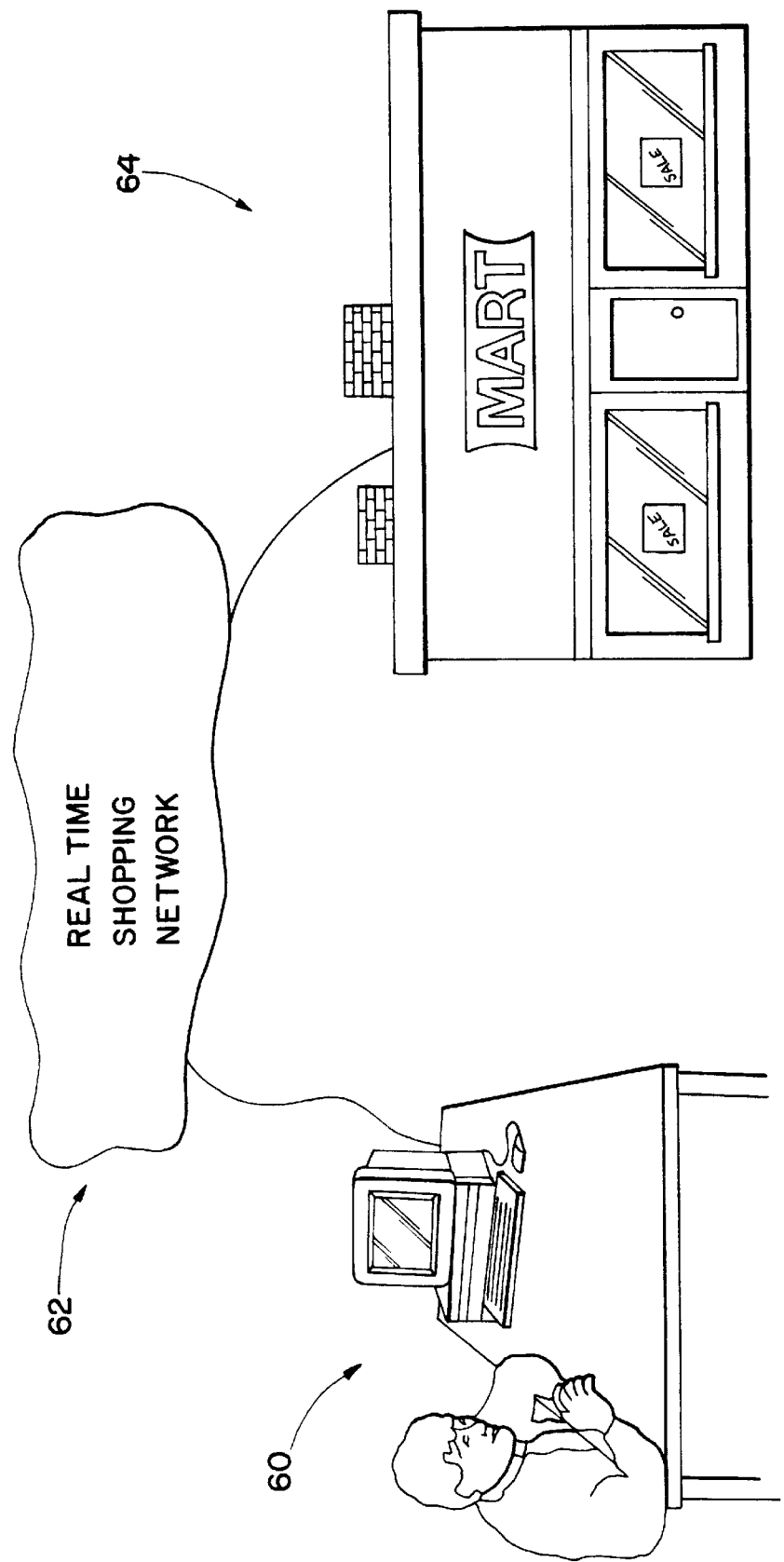
FIG. 4 is a conceptual view of the system of the present invention.

FIG. 4 exemplifies the present invention as viewed from a user's perspective. User 60 uses his computer and modem to establish a connection with the real time shopping network 62. The network 62 has a connection established with the merchant 64. The user 60 simply uses his computer and through the network 62 is enabled to obtain product/service information from the merchant 64 in real time.

An example of the present invention in use for a given individual will help to better explain the unique aspects of the invention. In this example, the user is shopping for a new computer system. The user logs his computer onto the network host utilizing interface management software provided by the network host. The user inputs request parameters to the interface for a search. For instance, the user may request information regarding desktop personal microcomputers that have a 486 or higher processor. The user may further define the information needed by requesting pricing, support, servicing, warranty and information regarding available accessories. Lastly, the user may request records regarding the volume of sales of the various merchants. The interface formats these search parameters and transmits the request to the network host. The network host, through network software, accesses the network database(s) that is updated in real time from the merchants and retrieves the requested information. The network host then processes the information into a usable protocol that enables the user interface management software to provide the data to the user in an appropriate presentation. The user's computer then receives the processed information from the network host and displays the information for the user in real time. Optionally, the user may request real time updates of the requested information. Then, the information on the user's computer is continuously updated as the information received from the merchants by the network host is updated. The result is that the user has access in a readily understandable format, on a single display screen, all requested information regarding desktop 486 computers in real time. This enables the user to comparison shop for the new computer.

The present invention is unique for several reasons, but primarily, it provides a one-stop service with which a user at a personal computer, may shop on-line using real time product/service information. Furthermore, in another embodiment of the present invention, data from several sources may be downloaded instantaneously to the user's computer by an indirect, yet immediate connection with a merchant via the network host and switch. In other words, a user of the present invention may choose to view batch information downloaded at preselected intervals, or the user may access the information instantaneously from the various merchants by a series of two-way communication paths existing between the user's personal computer, a network host, the merchant, and an optional switch. Furthermore, the present invention is unique in that it defines the various data layers to match the information provider's needs, user needs, and switch needs, to enable data to be used effectively from any source in any protocol by any user.

The present invention has been described in the form of preferred embodiments, but it is to be recognized that several modifications and variations to the invention could be made and fall within the scope of the subjoined claims.

What is claimed is:

1. A real-time shopping system comprising:
   a first connection between a first merchant computer and a network host computer, said first connection for transmitting product information from said first merchant computer to said network host computer in accordance with a first type of connectivity;
   a second connection between a second merchant computer and said network host computer, said second connection for transmitting product information from said second merchant computer to said network host computer in accordance with a second type of connectivity;
   a database at said network host computer for storing said product information from said first merchant computer and said second merchant computer;
   a first computer program at said network host computer for processing said product information from said first merchant computer and said second merchant computer;
   a third connection between said network host computer and a customer computer, said third connection for transmitting said processed product information to said customer computer and for transmitting customer computer requests for real-time updates of said processed product information; and
   a customer computer request for a real-time update of said processed product information whereby said network host computer responds to said customer computer request by requesting product information from said first merchant computer and said second merchant computer, processing said product information from said first merchant computer and said second merchant computer, and transmitting said processed product information to said customer computer.

2. The system of claim 1 wherein said first type of connectivity and said second type of connectivity are selected from the group of TCP/IP, SNA, or X.25 connectivity.

3. The system of claim 1 wherein said first connection and said second connection further comprise:
   a connection between said first merchant computer and a regional host computer;
   a connection between said second merchant computer and said regional host computer; and
   a connection between said regional host computer and said network host computer, wherein said regional host computer receives said product information from said first merchant computer and said second merchant computer and transmits said product information to said network host computer.

* * * * *

UNITED STATES PATENT AND TRADEMARK OFFICE
CERTIFICATE OF CORRECTION

PATENT NO. : 6,009,413
DATED : December 28, 1999
INVENTOR(S) : Webber, et al.

It is certified that error appears in the above-identified patent and that said Letters Patent is hereby corrected as shown below:

In column 4, line 29, please delete "connectity" and replace it with -- connectivity --.

Signed and Sealed this

Seventh Day of November, 2000

Attest:

Q. TODD DICKINSON

*Attesting Officer*      *Director of Patents and Trademarks*